US012594862B2

(12) United States Patent
Chen

(10) Patent No.: US 12,594,862 B2
(45) Date of Patent: Apr. 7, 2026

(54) BABY CARRIER

(71) Applicant: Bambino Prezioso Switzerland AG,
Steinhausen (CH)

(72) Inventor: Yingzhong Chen, Dongguan (CN)

(73) Assignee: Bambino Prezioso Switzerland AG,
Steinhausen (CH)

( * ) Notice: Subject to any disclaimer, the term of this
patent is extended or adjusted under 35
U.S.C. 154(b) by 118 days.

(21) Appl. No.: 18/263,056

(22) PCT Filed: Jan. 27, 2022

(86) PCT No.: PCT/EP2022/051861
§ 371 (c)(1),
(2) Date: Jul. 26, 2023

(87) PCT Pub. No.: WO2022/162049
PCT Pub. Date: Aug. 4, 2022

(65) Prior Publication Data
US 2024/0083311 A1      Mar. 14, 2024

(30) Foreign Application Priority Data
Jan. 29, 2021    (CN) .......................... 202110134546.6

(51) Int. Cl.
B60N 2/28              (2006.01)
(52) U.S. Cl.
CPC ......... B60N 2/2845 (2013.01); B60N 2/2824
(2013.01); B60N 2/2869 (2013.01)
(58) Field of Classification Search
CPC ............................. B60N 2/2869; B60N 2/2824
See application file for complete search history.

(56) References Cited

U.S. PATENT DOCUMENTS 4,762,364 A * 8/1988 Young .................. B60N 2/2878
297/256.12 X
4,936,629 A * 6/1990 Young .................. B60N 2/2821
297/256.12 X
(Continued)

FOREIGN PATENT DOCUMENTS

BR      202017011096 U2      9/2017
CN          1187433 A      7/1998
(Continued)

OTHER PUBLICATIONS

Chinese Office Action issued in corresponding Application No.
202110134546.6 dated Nov. 25, 2023.
(Continued)

*Primary Examiner* — Rodney B White
(74) *Attorney, Agent, or Firm* — Volpe Koenig

(57) ABSTRACT

The present disclosure provides a baby carrier, the baby
carrier has a rotary structure, the rotary structure includes a
first base portion and a second base portion rotatably dis-
posed on the first base portion, at least two positioning holes
are provided on the first base portion, a telescoping posi-
tioning member is provided on the second base portion, and
the second base portion rotates relative to the first base
portion and enables the positioning member to cooperate
with different positioning holes so as to lock the second base
portion to different positions of the first base portion. The
baby carrier of the present disclosure has a rotary structure,
and the baby carrier may rotate to different positions through
the rotary structure, thereby providing different visual expe-
rience for the baby, and being convenient for the caregiver
to take care of the baby.

20 Claims, 12 Drawing Sheets

(56) References Cited

U.S. PATENT DOCUMENTS

| | | | | | |
|---|---|---|---|---|---|
| 4,971,392 | A | * | 11/1990 | Young | B60N 2/2821 |
| | | | | | 297/256.12 X |
| 5,183,312 | A | * | 2/1993 | Nania | B60N 2/2821 |
| | | | | | 297/256.12 X |
| 5,524,964 | A | * | 6/1996 | Weimersheimer | B60N 2/2821 |
| | | | | | 297/256.12 |
| 6,260,920 | B1 | * | 7/2001 | Tolfsen | B60N 2/143 |
| | | | | | 297/256.12 X |
| 6,520,579 | B2 | * | 2/2003 | Kassai | B60N 2/146 |
| | | | | | 297/256.12 X |
| 7,357,451 | B2 | * | 4/2008 | Bendure | B60N 2/2869 |
| | | | | | 297/256.12 |
| 7,575,276 | B1 | * | 8/2009 | Henry | B60N 2/2869 |
| | | | | | 297/256.12 X |
| 8,419,129 | B2 | * | 4/2013 | Inoue | B60N 2/2806 |
| | | | | | 297/256.12 X |
| 10,688,892 | B2 | * | 6/2020 | Anderson | B60N 2/2821 |
| 10,710,478 | B2 | * | 7/2020 | Reaves | B60N 2/2806 |
| 10,829,012 | B1 | * | 11/2020 | Brunick | B60N 2/2806 |
| 11,260,779 | B2 | * | 3/2022 | Brunick | B60N 2/2821 |
| 11,420,540 | B2 | * | 8/2022 | Williams | B60N 2/2821 |
| 11,427,114 | B2 | * | 8/2022 | Keegan | B60N 2/2875 |
| 11,485,258 | B2 | * | 11/2022 | Li | B60N 2/2887 |
| 11,584,267 | B2 | * | 2/2023 | Longenecker | B60N 2/2821 |
| 11,884,188 | B2 | * | 1/2024 | Brunick | B60N 2/2806 |
| 12,005,817 | B2 | * | 6/2024 | Keegan | B60N 2/2803 |
| 12,059,983 | B2 | * | 8/2024 | Li | B60N 2/2821 |
| 12,263,764 | B2 | * | 4/2025 | Longenecker | B60N 2/2821 |
| 12,263,765 | B2 | * | 4/2025 | Brunick | B60N 2/2875 |
| 2008/0224516 | A1 | * | 9/2008 | Vegt | B60N 2/2887 |
| | | | | | 297/256.16 |
| 2011/0298257 | A1 | | 12/2011 | Abadilla et al. | |
| 2020/0391627 | A1 | | 12/2020 | Williams | |
| 2022/0048415 | A1 | * | 2/2022 | Keegan | B60N 2/268 |
| 2023/0234480 | A1 | * | 7/2023 | Keegan | B60N 2/2875 |
| 2024/0149759 | A1 | * | 5/2024 | Brunick | B60N 2/2869 |
| 2024/0359602 | A1 | * | 10/2024 | Li | B60N 2/2872 |

FOREIGN PATENT DOCUMENTS

| | | | |
|---|---|---|---|
| CN | 201124777 | Y | 10/2008 |
| CN | 102336153 | A | 2/2012 |
| CN | 103568891 | A | 2/2014 |
| CN | 103754137 | A | 4/2014 |
| CN | 104228921 | A | 12/2014 |
| CN | 204367928 | U | 6/2015 |
| CN | 105015377 | A | 11/2015 |
| CN | 105691254 | A | 6/2016 |
| CN | 105966447 | A | 9/2016 |
| CN | 106494276 | A | 3/2017 |
| CN | 106945576 | A | 7/2017 |
| CN | 206561787 | U | 10/2017 |
| CN | 108237955 | A | 7/2018 |
| CN | 108621880 | A | 10/2018 |
| CN | 109895664 | A | 6/2019 |
| CN | 209938384 | U | 1/2020 |
| CN | 110979114 | A | 4/2020 |
| CN | 210478452 | U | 5/2020 |
| CN | 111483362 | A | 8/2020 |
| CN | 111619414 | A | 9/2020 |
| CN | 111845485 | A | 10/2020 |
| CN | 211641927 | U | 10/2020 |
| CN | 211684783 | U | 10/2020 |
| CN | 211765089 | U | 10/2020 |
| CN | 112078450 | A | 12/2020 |
| DE | 29506847 | U1 | 6/1995 |
| EP | 3257704 | B1 | 3/2020 |
| JP | H10250426 | A | 9/1998 |
| JP | 2010012900 | A | 1/2010 |
| KR | 1020160045705 | A | 4/2016 |
| WO | 2020069613 | A1 | 4/2020 |

OTHER PUBLICATIONS

Taiwanese Office Action for Application No. 111103495 dated Oct. 12, 2022.

International Search Report and Written Opinion for Application No. PCT/EP2022/051861 dated Apr. 7, 2022.

"First Office Action Issued in Corresponding Taiwanese Patent Application No. 112136602", Mailed Date: Apr. 8, 2024, 15 pages.

"Notification to Grant Patent Right for Invention Issued in Corresponding Chinese Patent Application No. 202110134546.6", Mailed Date: Apr. 26, 2024, 8 pages.

"Notice of Reasons for Refusal Issued in Corresponding Japanese Patent Application No. 2023-545367", Mailed Date: May 14, 2024, 8 pages.

"Notice of Allowance Issued in Corresponding Taiwanese Patent Application No. 114103320", Mailed Date: May 2, 2025, 9 pages.

Taiwan Intellectual Property Office. Office Action for corresponding application TW 114129570, dated Nov. 13, 2025. 6 pages.

* cited by examiner

1000

1000

100

100

100

100

20

100

12

1221        122

121

23

2321

232

231

BABY CARRIER

CROSS REFERENCE TO RELATED APPLICATIONS

This application is a 371 U.S. National Phase of International Patent Application No. PCT/EP2021/051861, filed on Jan. 27, 2022, titled "BABY CARRIER," which is based on and claims priority to Chinese Patent Application No. 202110134556.6, filed Jan. 29, 2021, which are incorporated herein by reference in their entirety.

TECHNICAL FIELD

The present disclosure relates to the technical field of baby products, and in particular, to a baby carrier.

BACKGROUND

With the increasing attention on the safety issues, more and more parents choose car safety seats to increase safety of the babies during riding in cars. When a baby seats in a car, a safety seat may be installed on a seat of the car to provide safety protection for the baby during riding. However, the existing safety seat is non-rotatably fixed on the seat, so that a vision field of the baby on the safety seat is limited, and it is also inconvenient for a caregiver for the baby since the safety seat is non-rotatably fixed on the seat.

SUMMARY

The present disclosure provides a baby carrier, the baby carrier has a rotary structure, the rotary structure includes a first base portion and a second base portion rotatably disposed on the first base portion, at least two positioning holes are provided on the first base portion, a telescoping positioning member is provided on the second base portion, and the second base portion is rotated relative to the first base portion, and enables the positioning member to cooperate with different positioning holes to lock the second base portion to different positions of the first base portion.

The baby carrier of the present disclosure has a rotary structure, the carrier body may be installed on the rotary structure, and the rotary structure may drive the carrier body to rotate so as to adjust a position of the carrier body relative to an undersurface, thereby providing different visual experience for the baby who uses the baby carrier and being convenient for the caregiver to take care of the baby. The carrier body may be rotated by the caregiver to a suitable position to facilitate taking care of the baby. Specifically, the rotary structure includes a first base portion and a second base portion rotatably connected to the first base portion. A positioning member is provided on the second base portion, and a plurality of positioning holes are provided on the first base portion. The second base portion may be rotated along the first base portion when the positioning member is retracted into the second base portion, and the positioning member within the second base portion extends out of the second base portion and cooperates with the positioning hole on the corresponding position when the second base portion is rotated to a position where it is required to be fixed, thereby fixing the second base portion on the first base portion. The positioning member cooperates with the positioning holes on different positions, so that the second base portion may be rotated and locked to different positions of the first base portion. The baby carrier of the present disclosure may be rotated to different positions through the rotary structure, which is more convenient to use and can provide different visual experiences for the baby, and which is also convenient for the caregiver to take care of the baby and suitable for widespread use.

In an embodiment, the rotary structure also includes a frame connected with the first base portion. The frame is provided, so that the first base portion may be fixed through the frame.

In an embodiment, the first base portion is slidably disposed at the frame, and the first base portion is clamped with the frame at multiple sections. The first base portion may slide along the frame, so that a position between the first base portion and the frame is adjustable, and clamping between the first base portion and the frame is performed after the position is adjusted into a suitable position. Thus, the structure is simple, and the design is reasonable.

In an embodiment, the positioning holes are located on the same circumference. The second base portion is rotated around a center of rotation of the first base portion, and the positioning member cooperates with the positioning hole on the corresponding position when the second base portion is rotated to a suitable position, i.e., a plurality of positioning holes are arranged about the center of rotation as a center of a circle.

In an embodiment, a driving member is also provided on the second base portion for driving the positioning member. The positioning member may be driven by the driving member, so that the positioning member is telescopically disposed on the second base portion.

In an embodiment, the driving member is provided at an end thereof with a driving portion cooperating with the positioning member, and the driving portion is positioned at a periphery of the positioning member. The driving portion on the driving member is disposed at the periphery of the positioning member, so that the driving portion cooperates with the positioning member.

In an embodiment, the positioning member is provided with a positioning portion in a first direction, a driving inclined slot is provided on the driving portion for cooperating with the positioning portion, and the positioning portion is slidably disposed within the driving inclined slot. The positioning portion on the positioning member extends into the driving inclined slot in the driving portion, and when the driving member moves, the positioning portion slides along the driving inclined slot.

In an embodiment, the driving inclined slot is disposed obliquely on the driving portion at a preset angle. The driving inclined slot is disposed obliquely, so that when the positioning portion slides along the driving inclined slot, a motion in the horizontal direction may be converted into a motion in the vertical direction.

In an embodiment, an end of the driving member away from the driving portion is connected with an unlocking operating element, an end of the unlocking operating element protrudes out of the second base portion. The driving portion slides with the unlocking operating element by means of operating the unlocking operating element and drives the positioning portion to slide along the driving inclined slot, thereby disengaging the positioning member from the positioning hole to unlock. An end of the driving member is the unlocking operating element protruding out of the second base portion, and the driving portion may be driven to slide in the horizontal direction through pulling the unlocking operating element. The obliquely disposed driving inclined slot cooperates with the positioning portion, so that the positioning member moves upwards with the driving inclined slot when the driving inclined slot slides along the positioning portion, thereby causing the positioning member to be disengaged from the positioning hole to unlock.

In an embodiment, a first reset member is provided on the unlocking operating element for providing a reset trend for the unlocking operating element. The first reset member is provided, so that the unlocking operating element may automatically return after being driven.

In an embodiment, the positioning member is provided with a positioning pin, the positioning pin is clamped with the positioning hole with movement of the positioning member or clamped with the positioning hole and the frame hole, or the positioning pin is disengaged from the positioning hole with movement of the positioning member. The positioning member cooperates with the positioning hole through the positioning pin located inside the positioning member, the frame is provided with a frame hole, and when the second base portion is rotated to a position where the positioning hole and the frame hole coincide with each other, the positioning pin extends out of the second base portion, and the positioning pin may be clamped with the positioning hole and the frame hole simultaneously, so that the connection among the first base portion, the second base portion and the frame becomes more stable; and when the second base portion is rotated to other positions of the first base portion, the positioning pin is only clamped within the positioning hole; and when the driving member is driven, the positioning pin is disengaged from the positioning hole, i.e., unlocking.

In an embodiment, the positioning pin is detachably disposed within the positioning member. The positioning pin may be detached from inside of the positioning member, which is convenient for replacement after it is worn.

In an embodiment, the positioning pin and the positioning member are formed as an integral structure. The positioning pin is integrally formed with the positioning member, and the structure is more stable.

In an embodiment, a locking member is provided on the first base portion for locking with the second base portion or the frame. The locking member is disposed, so that the first base portion needs to slide to a preset position of the frame to be rotated between the first base portion and the second base portion.

In an embodiment, an end of the locking member is provided with a pushing portion cooperating with the second base portion, and the other end of the locking member is provided with a clamping portion cooperating with the frame. The locking member is located on the first base portion, an end of the locking member cooperates with the second base portion, and the other end of the locking member cooperates with the frame.

In an embodiment, the second base portion also includes a rotational unlocking member thereon. The unlocking member is rotatably disposed on the second base portion, and the unlocking member is rotated so that the unlocking member acts on the locking member.

In an embodiment, the unlocking member is provided with an unlocking portion for cooperating with the pushing portion. The unlocking portion on the unlocking member cooperates with the pushing portion on the locking member to perform unlocking.

In an embodiment, the pushing portion is provided with a pushing inclined surface, the unlocking portion is provided with a driving inclined surface, and the pushing inclined surface is in slide contact with the driving inclined surface. The unlocking member acts to enable the driving inclined surface to press the pushing inclined surface, and there is slide contact between the pushing inclined surface and the driving inclined surface.

In an embodiment, the frame has a locking position and an unlocking position for cooperating with the locking member. When the first base portion slides into the locking position along the frame, the pushing portion is clamped with the unlocking portion to stop the second base portion from being rotated relative to the first base portion; and when the first base portion slides into the unlocking position along the frame, the pushing portion slides at the unlocking portion to unlock by means of driving the unlocking member, thereby enable the second base portion to be rotatable relative to the first base portion. An end of the locking member cooperates with the second base portion, and the other end of the locking member cooperates with frame. When the first base portion slides into the locking position of the frame, the clamping portion on the locking member is away from a clamping hole on the frame, so that the driving portion cannot push the pushing portion and the second base portion is fixed on the first base portion so as to stop the second base portion from being rotated relative to the first base portion; and when the first base portion slides to the unlocking position of the frame, the clamping portion on the locking member is aligned with the clamping hole on the frame. When the driving portion presses the pushing portion, the locking member acts to enable the clamping portion on the locking member to be clamped within the clamping hole of the frame, so that locking member is disengaged from the unlocking member, thereby causing unlocking between the second base portion and the first base portion.

In an embodiment, the frame is provided with a clamping hole for cooperating with the clamping portion, and when the first base portion slides into the clamping portion along the frame and is clamped with the clamping hole, the second base portion is rotatable relative to the first base portion. The clamping portion is clamped within the clamping hole of the frame, so that the locking member is disengaged from the unlocking member, thereby unlocking between the first base portion and the second base portion to be rotatable relative to each other.

In an embodiment, a second reset member is provided on the locking member for contacting the locking member with the unlocking member. The second reset member is provided, so that when the second base portion is rotated to enable the locking member to be aligned with the unlocking member, the locking member may automatically reset.

In an embodiment, a third reset member is provided on the unlocking member for providing a constant reset trend for the unlocking member. The unlocking member may automatically return through the third reset member after the unlocking member is rotated and presses the locking member.

Figure 1:
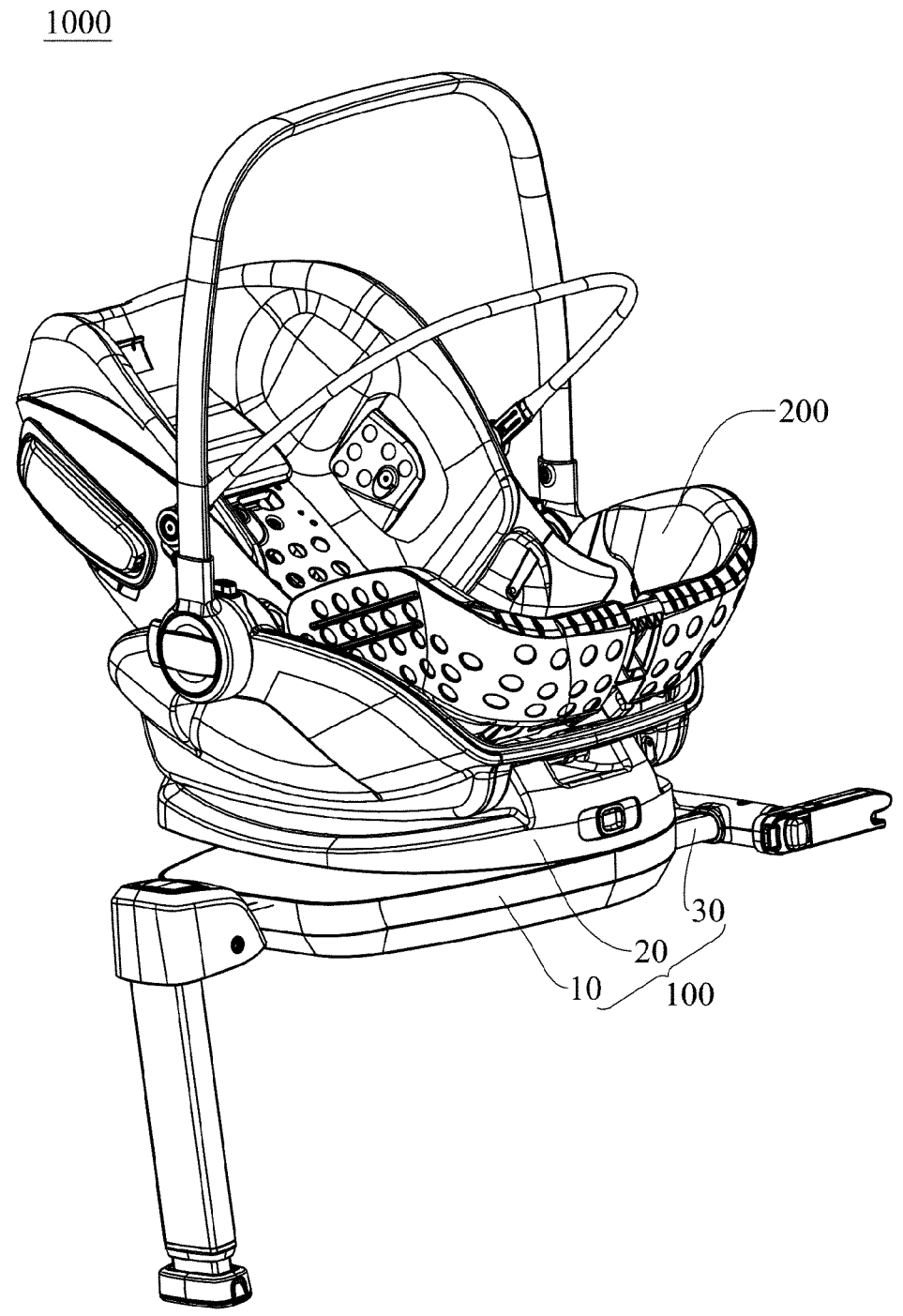
FIG. 1 is a structural schematic view of a baby carrier according to an embodiment of the present disclosure.
Figure 2:
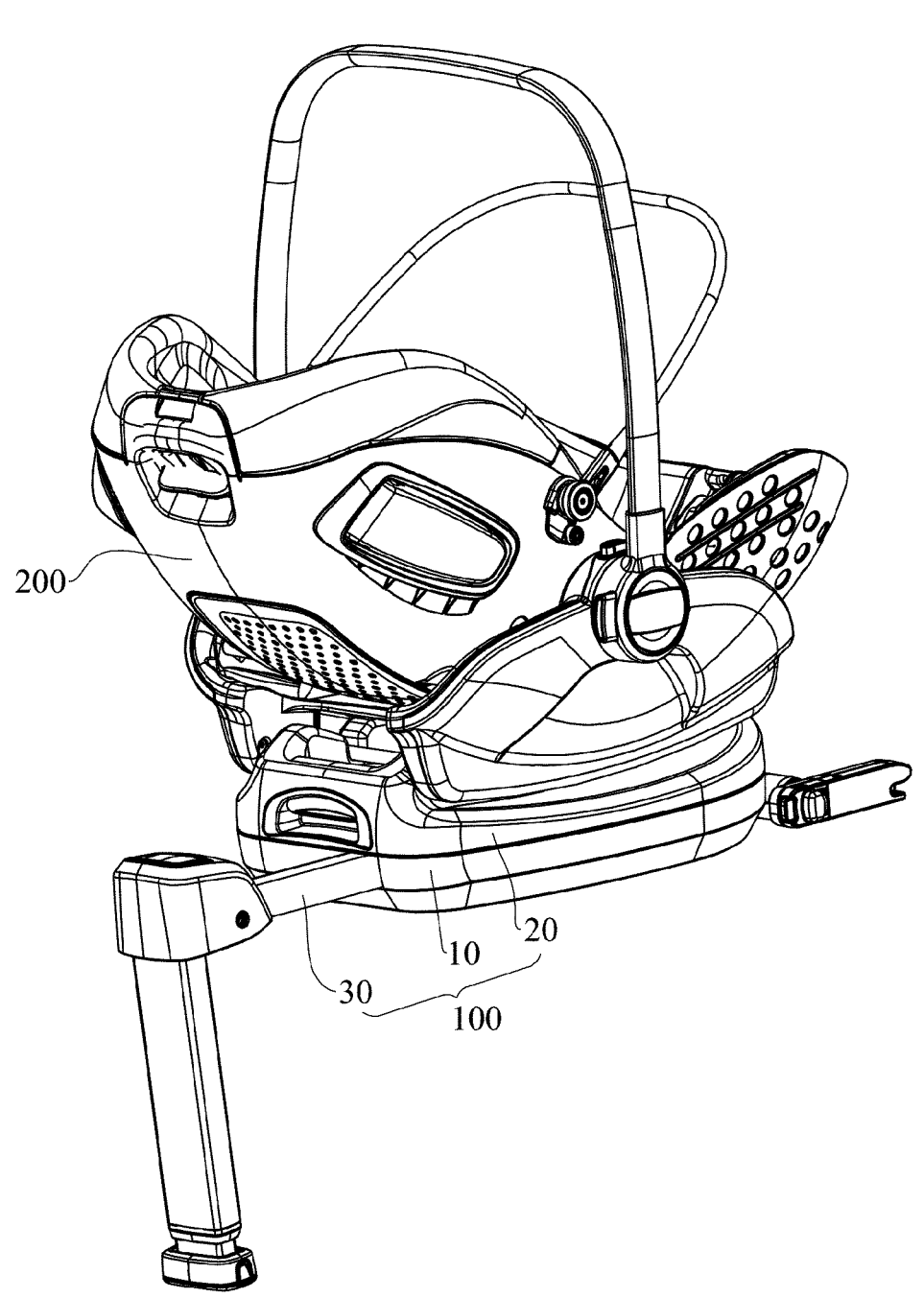
FIG. 2 is a structural schematic view of the baby carrier in FIG. 1 in another state.
Figure 3:
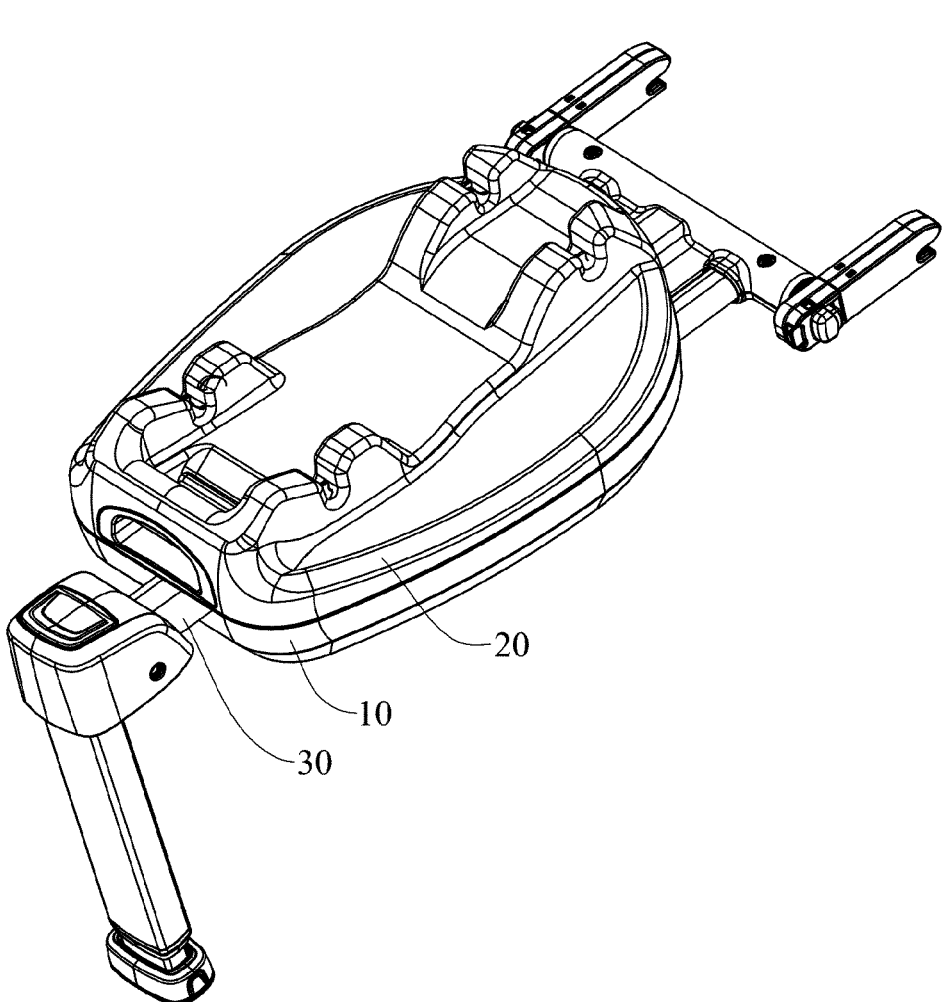
FIG. 3 a structural schematic view of a rotary structure in FIG. 1.
Figure 4:
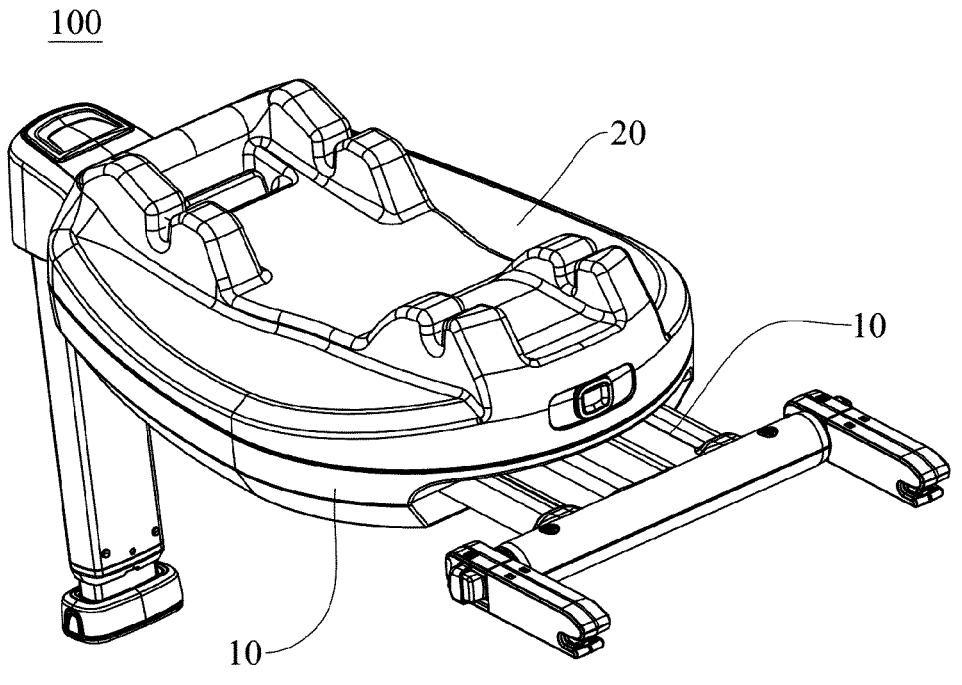
FIG. 4 is a structural schematic view of the rotary structure in FIG. 3 from another angle.
Figure 5:
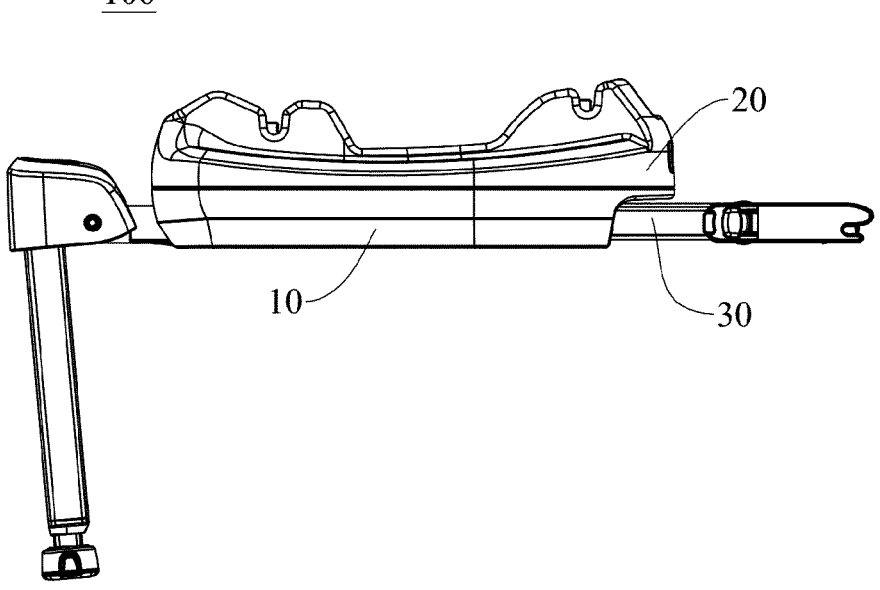
FIG. 5 is a structural schematic view of the rotary structure in FIG. 3 from yet another angle.
Figure 6:
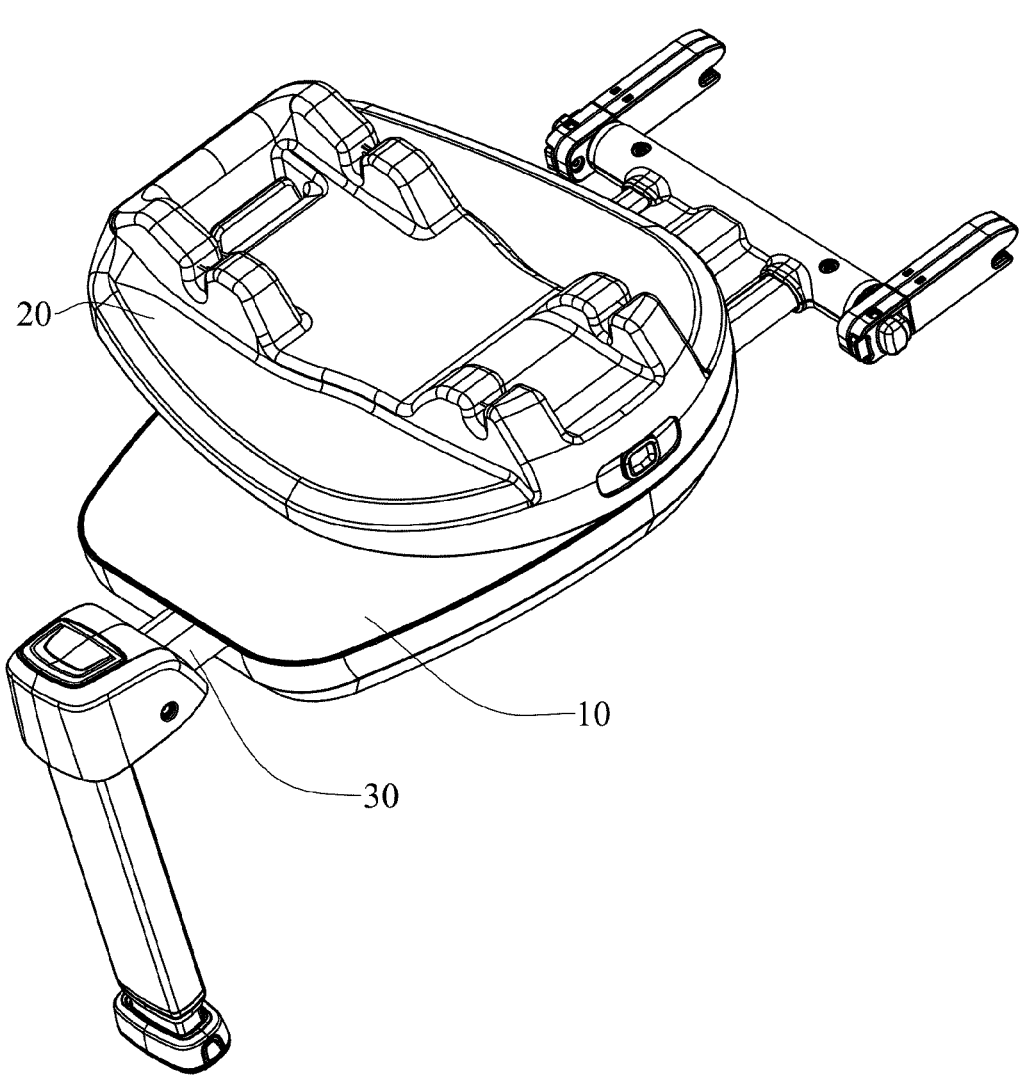
FIG. 6 is a structural schematic view of the rotary structure in FIG. 3 in a rotation state.

Reference numbers are as follows:

1000—baby carrier;

100—rotary structure;

10—first base portion; 101—first housing; 11—positioning hole; 12—locking member; 121—clamping portion; 122—pushing portion; 1221—pushing inclined surface; 13—second reset member; 14—first rotating rail;

20—second base portion; 201—second housing; 21—driving member; 211—driving portion; 2111—driving inclined slot; 212—connecting portion; 213—unlocking lever; 22—positioning member; 221—positioning portion; 222—positioning pin; 23—unlocking member; 231—operating portion; 232—unlocking portion; 2321—driving inclined surface; 24—first reset member; 25—third reset member; 26—second rotating rail;

30—frame; 301—third housing; 31—section hole; 32—frame hole; 33—clamping hole;

200—carrier body.

DETAILED DESCRIPTION

In order to illustrate the technical contents and the structural features of the present disclosure in detail, a further description will be made below in combination with the embodiments and with reference to the accompanying drawings.

Referring to FIGS. 1 to 9, the present disclosure provides a baby carrier 1000 including a carrier body 200 for carrying a baby and a rotary structure 100, and the carrier body 200 is detachably disposed on the rotary structure 100. Specifically, the rotary structure 100 includes a first base portion 10 and a second base portion 20 rotatably disposed on the first base portion 10. At least two positioning holes 11 are provided on the first base portion 10, and a telescopic positioning member 22 is provided on the second base portion 20. When the positioning member 22 of second base portion 20 is retracted within the second base portion 20, the second base portion 20 is rotatable relative to the first base portion 10, and when the second base portion 20 is rotated to a suitable position, the positioning member 22 is driven so that the positioning member 22 extends from inside of the second base portion 20 and cooperates with the positioning hole 11 on the corresponding position to fix the second base portion 20 on the first base portion 10. It may be understood that the positioning member 22 may cooperate with the positioning holes 11 on different positions to lock the second base portion 20 to different positions of the first base portion 10. In the present embodiment, the baby carrier 1000 is a baby safety seat, and the carrier body 200 (i.e., a seat body) is detachably installed on the rotary structure 100.

The baby carrier 1000 of the present disclosure has a rotary structure 100, the carrier body 200 is installed on the rotary structure 100, the rotary structure 100 may drive the carrier body 200 to rotate so as to adjust a position of the carrier body 200 relative to an undersurface, and the undersurface may be a seat surface of a seat or other vehicle used for installing a safety seat. The rotation of the rotary structure 100 may provide different visual experiences for the baby who uses the baby carrier, and being convenient for the caregiver to take care of the baby. The carrier body may be rotated by the caregiver to a suitable position to facilitate taking care of the baby. The baby carrier 1000 of the present disclosure has relatively strong practicability, and is suitable for widespread use. The rotary structure 100 of the present disclosure includes a first base portion 10 and a second base portion 20 rotatably connected to the first base portion 10. A positioning member 22 is provided on the second base portion 20, and a plurality of positioning holes 11 are provided on the first base portion 10. When the positioning member 22 is retracted into the second base portion 20, the second base portion 20 may be rotated along the first base portion 10, and when the second base portion 20 is rotated to a position where it is required to be fixed, the positioning member 22 within the second base portion 20 extends out of the second base portion 20 and cooperates with the positioning hole 11 on the corresponding position, thereby fixing the second base portion 20 on the first base portion 10. The positioning member 22 cooperates with the positioning holes 11 on different positions, so that the second base portion 20 may be rotated and locked to different positions of the first base portion 10. In the rotary structure 100 of the present disclosure, the structure is simple, and rotation between the first base portion 10 and the second base portion 20 may perform angle adjustment, so that the seat installed on the rotary structure 100 may be located in different locations of the vehicle seat according to actual requirements. Thus, it is safe and reliable, and more convenient for the caregiver to take care of the baby.

Referring to FIGS. 3 to 7 and FIGS. 11 to 15, in some optional embodiments, the rotary structure 100 also includes a frame 30 connected with the first base portion 10, the first base portion 10 is slidably disposed at the frame 30, and the first base portion 10 is clamped with the frame 30 at multiple sections. The frame 30 is provided so that the first base portion 10 may be fixed through the frame 30. A plurality of section holes 31 are provided on the frame 30 for cooperating with the first base portions 10, the first base portion 10 slides along the frame 30, and the first base portion 10 may be clamped and fixed on the frame 30 through the section holes 31. It could be understood that the position between the first base portion 10 and the frame 30 is adjustable, and the first base portion 10 is adjusted to a suitable position, and then clamped and fixed.

Figure 7:
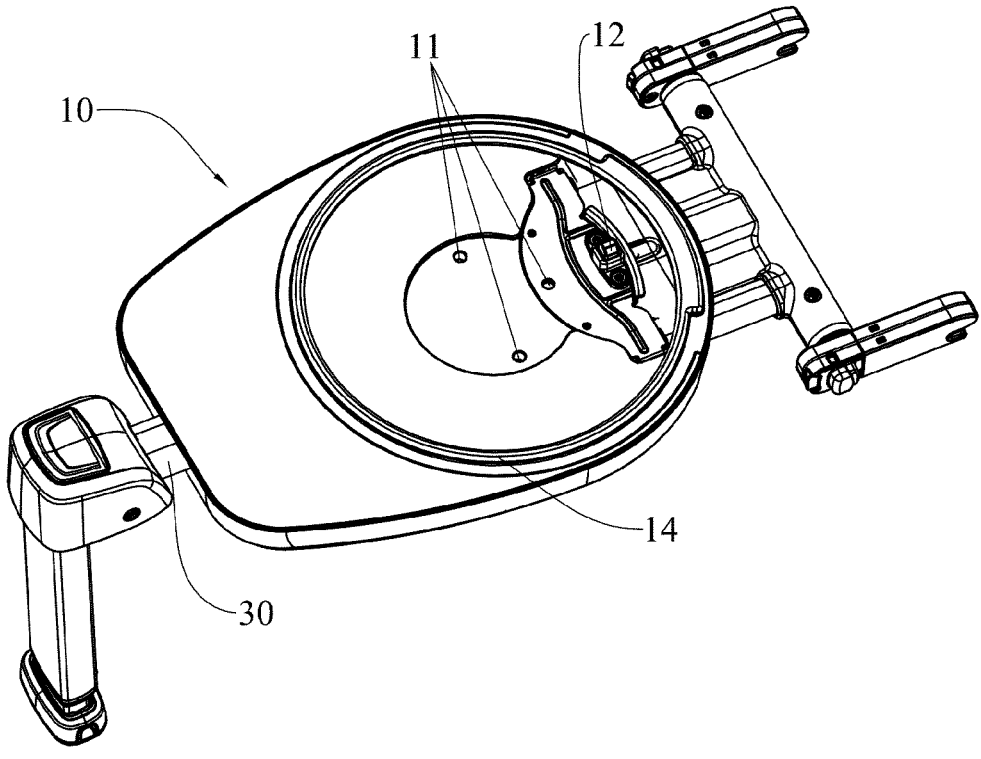
FIG. 7 is a structural schematic view in which a first base portion cooperates with a frame in FIG. 3.
Figure 8:
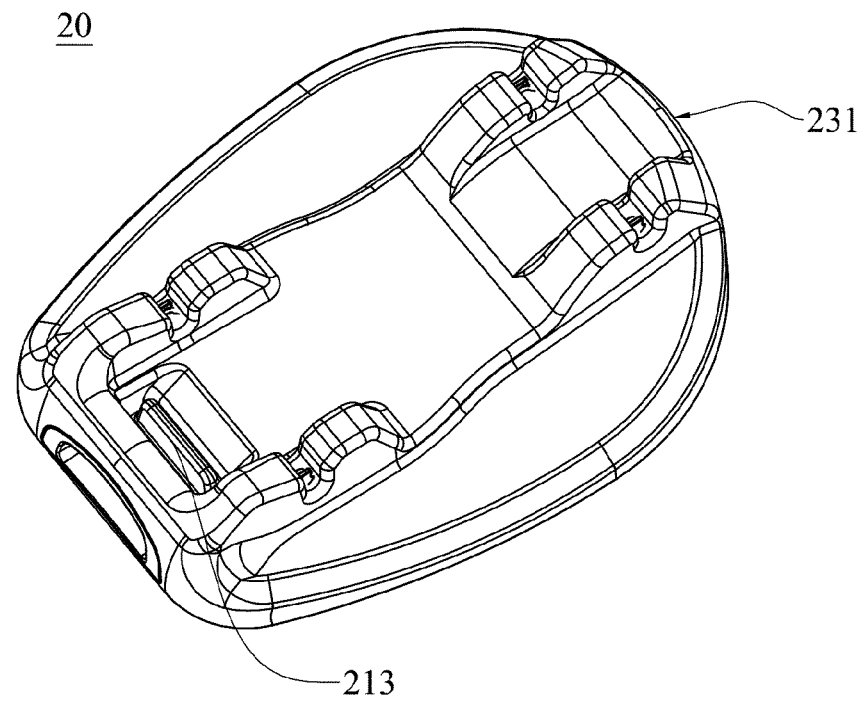
FIG. 8 is a structural schematic view of a second base portion in FIG. 3.
Figure 9:
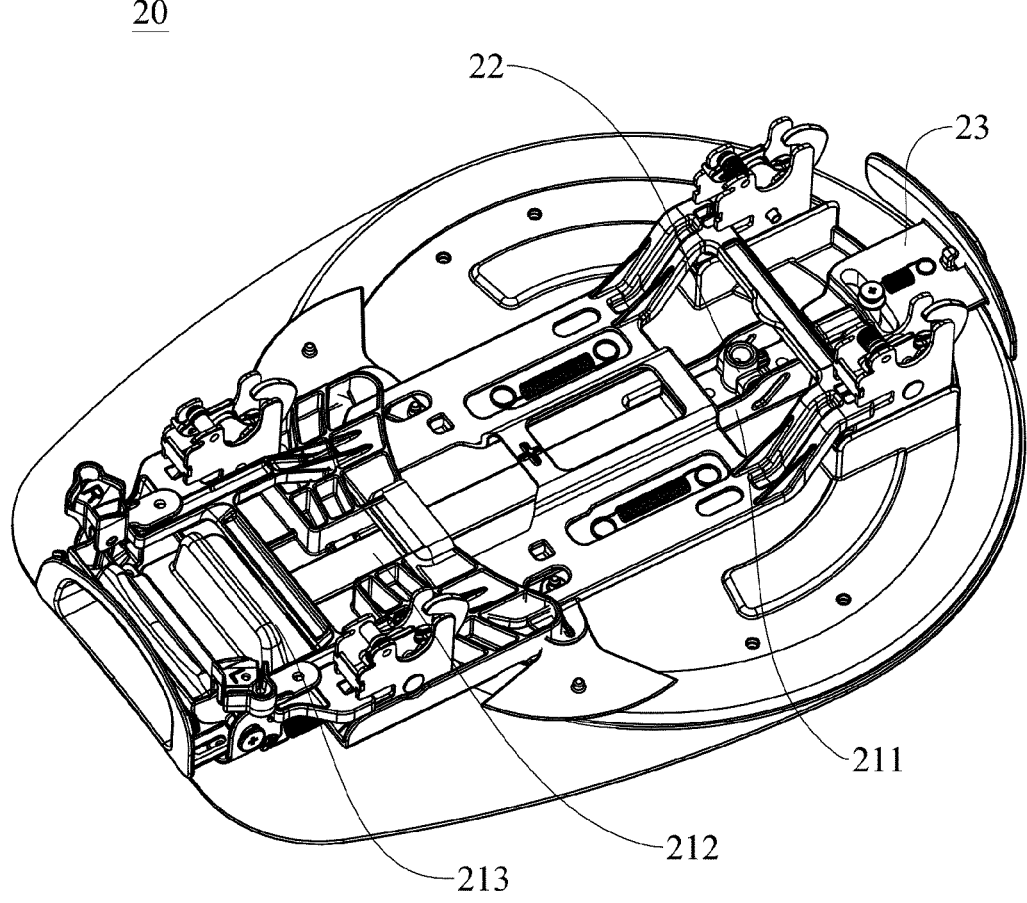
FIG. 9 is an internally structural schematic view of the second base portion in FIG. 8.
Figure 10:
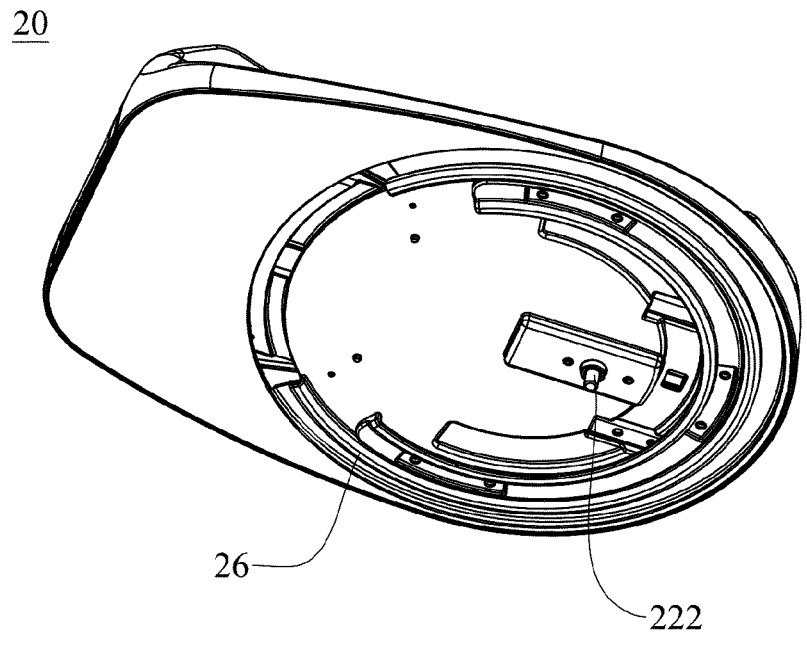
FIG. 10 is a structural schematic view of the second base portion in FIG. 8 from another angle.
Figure 11:
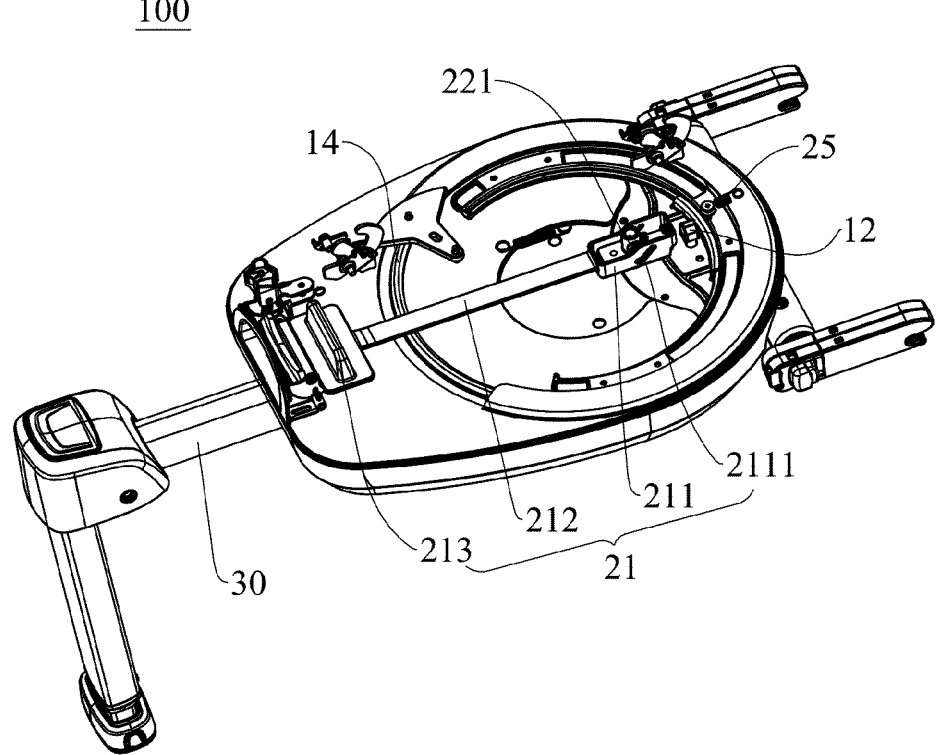
FIG. 11 is an internally structural schematic view of the rotary structure of FIG. 3 with a housing removed.
Figure 12:
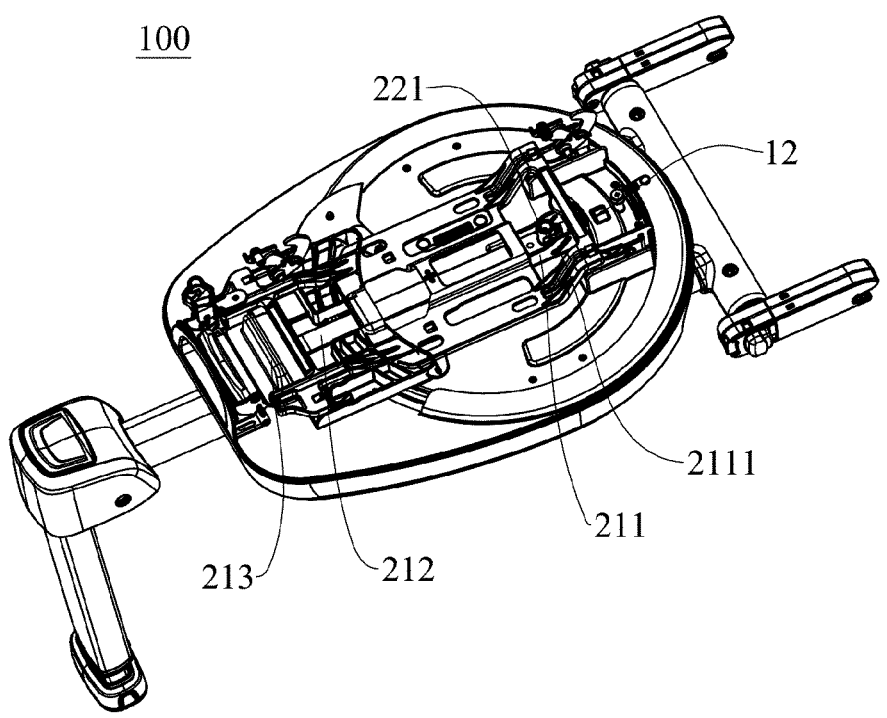
FIG. 12 is an internally structural schematic view of the rotary structure in FIG. 3 in a state.
Figure 13:
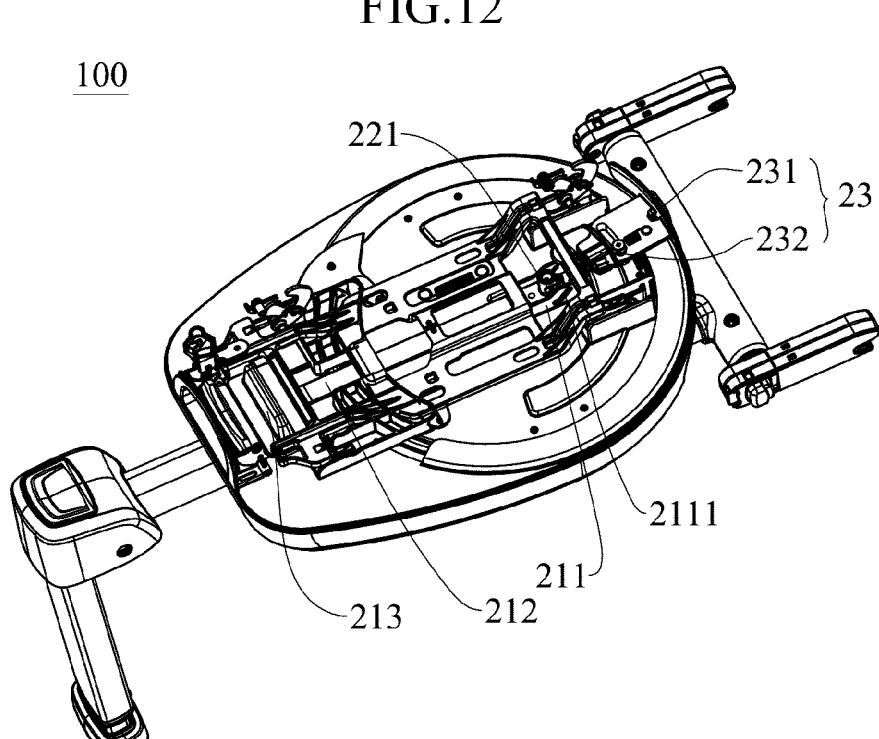
FIG. 13 is an internally structural schematic view of the rotary structure in FIG. 3 in another state.

Referring to the FIGS. 7 and 10, in some optional embodiments, a plurality of positioning holes 11 are located on the same circumference. It may be understood that the second base portion 20 is rotated around a center of rotation of the first base portion 10, the first base portion 10 is provided with a first rotating rail 14, the second base portion 20 is provided with a second rotating rail 26, and the first rotating rail 14 cooperates with the second rotating rail 26. When the first base portion 10 is located at the most front of the frame 30, the second base portion 20 may be rotated along the first base portion 10, and when it is rotated to a suitable position, the positioning member 22 cooperates with the positioning hole 11 on the corresponding position for fixation, i.e., the plurality of positioning holes 11 are arranged with a center of rotation as a center of a circle.

Referring to FIGS. 8, 9, and 11 to 17, in some optional embodiments, the second base portion 20 is also provided with a driving member 21 for driving the positioning member 22. Specifically, the driving member 21 is provided an end thereof with a driving portion 211 cooperating with the positioning member 22, the driving portion 211 is located at a periphery of the positioning member 22, the driving portion 211 has a hollow housing structure, and the positioning member 22 is located within the driving portion 211. The positioning member 22 is provided with a protruding positioning portion 221 in a first direction, a driving inclined slot 2111 is provided on the driving portion 211 for cooperating with the positioning portion 221, and the positioning portion 221 is slidably provided within the driving inclined slot 2111. It may be understood that the first direction is a direction perpendicular to the positioning member 22, i.e., a direction extending towards the driving portion 211 on the positioning member 22. The driving inclined slot 2111 is disposed obliquely on the driving portion 211 at a preset angle. In the locking state, the positioning portion 221 is located at a lower end of the driving inclined slot 2111 to position the positioning member 22 within the positioning hole 11. During unlocking, the driving member 21 is operated, the driving inclined slot 2111 slides and drives the positioning portion 221 to slide within the driving inclined slot 2111, and with the sliding of the driving inclined slot 2111, the positioning portion 221 generally rises from the lower end of the driving inclined slot 2111, so that the positioning member 22 is driven to rise, and thus the positioning member 22 is disengaged from the positioning hole 11 to perform unlocking. It could be understood that the preset angle may be 30°, 40°, 45° or the like. As long as the driving inclined slot 2111 is disposed obliquely to convert a motion in the horizontal direction into a motion in the vertical direction, the driving member 21 may drive the positioning member 22 to be disengaged from the positioning hole 11 when the driving member 21 slides.

Figure 17:
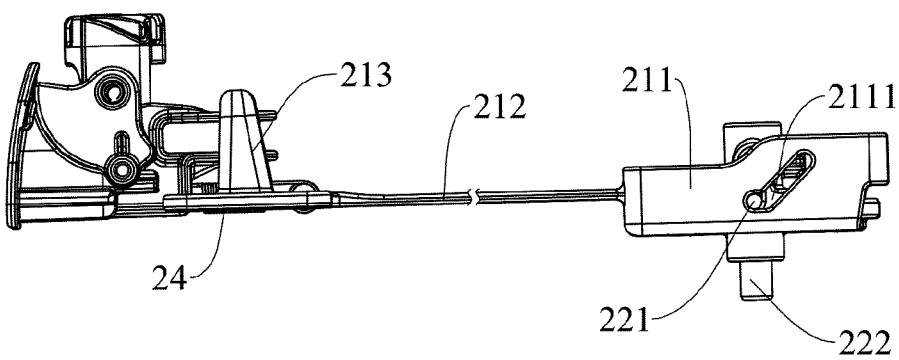
FIG. 17 is a structural schematic view of a driving member in FIG. 3.
Figure 18:
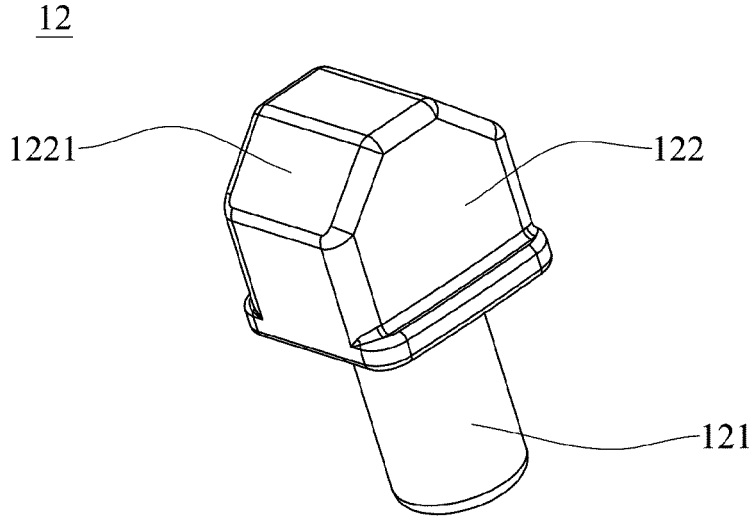
FIG. 18 is a structural schematic view of a locking member in FIG. 3.
Figure 19:
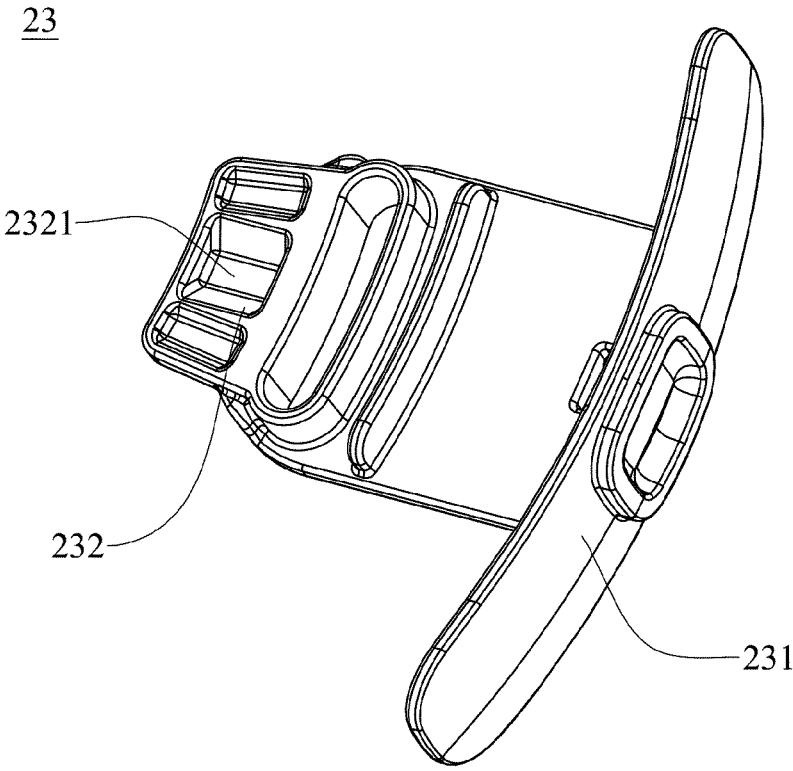
FIG. 19 is a structural schematic view of an unlocking member in FIG. 3.

Referring to FIG. 17, in some optional embodiments, an unlocking operating element (for example, an unlocking operating element 213 or other structures) is provided at an end of the driving member 21 away from the driving portion 211, and the unlocking lever 213 is connected to the driving portion 211 through a connecting portion 212. The unlocking lever 213, the connecting portion 212 and the driving portion 211 may be an integrally formed structure, or may be formed individually and connected together. An end of the unlocking lever 213 protrudes out of the second base portion 20, and by means of operating the unlocking lever 213 and acting on the driving portion 211 through the connecting portion 212, the driving portion 211 drives the positioning portion 221 to slide along the driving inclined slot 2111 with the sliding of the unlocking lever 213, so that the positioning member 22 is disengaged from the positioning hole 11 to perform unlocking. It may be understood that an end of the driving member 21 is the unlocking lever 213 protruding out of the second base portion 20, the unlocking lever 213 is pulled to drive the driving portion 211 to slide in the horizontal direction, and the disposed obliquely driving inclined slot 2111 cooperates with the positioning portion 221, so that when the driving inclined slot 2111 slides along the positioning portion 221, the driving inclined slot 2111 drives the positioning member 22 to move upwards, thereby causing the positioning member 22 to be disengaged from the positioning hole 11 to perform unlocking. Specifically, the unlocking lever 213 is provided with a first reset member 24 providing a constant reset trend for the unlocking lever 213, and the first reset member 24 may be configured to have a spring structure. The first reset member 24 having the spring structure is provided, so that the unlocking lever 213 may return automatically after the unlocking lever 213 is driven.

Referring to the FIGS. 10 and 14 to 17, in some optional embodiments, the positioning member 22 includes a positioning pin 222, and an end of the positioning pin 222 away from the positioning portion 221 protrudes out of the positioning member 22, so as to cooperate with the first base portion 10 and the frame 30. Specifically, the frame 30 is provided with a plurality of frame holes 32, the motion of the positioning member 22 clamps the positioning pin 222 with the positioning hole 11 or clamps the positioning pin 222 with the positioning hole 11 and the frame hole 32, or alternatively, the positioning member 22 acts to disengage the positioning pin 222 from the positioning hole 11 or disengage the positioning pin 222 from the positioning hole 11 and the frame hole 32. It could be understood that the positioning member 22 cooperates with the positioning hole 11 through the positioning pin 222 within the positioning member 22, and the frame 30 is provided with the frame holes 32. When the positioning hole 11 and the frame hole 32 coincide with each other and the second base portion 20 is not rotated, the positioning pin 222 extends out of the second base portion 20, and the positioning pin 222 may be simultaneously clamped with the positioning hole 11 and the frame hole 32, so that the connection among the first base portion 10, the second base portion 20, and the frame 30 becomes more stable. When the second base portion 20 is rotated to other positions of the first base portion 10, the positioning pin 222 is only clamped within the positioning hole 11. When the driving member 21 is driven, the positioning pin 222 is disengaged from the positioning hole 11 to unlock, so that the second base portion 20 may be rotated on the first base portion 10. The positioning pin 222 may be detachably provided within the positioning member 22. The positioning pin 222 may be detached from inside of the positioning member 22, which is convenient for replacement after it is worn. Of course, the positioning pin 222 and the positioning member 22 may also be formed as an integral structure, and the positioning pin 222 and the positioning member 22 are integrally disposed, so that the structure is more stable.

Referring to FIGS. 7, 11 to 16, 18, and 19, in some optional embodiments, a locking member 12 is also provided on the first base portion 10 for being lockable with the second base portion 20 or the frame 30, and a rotational unlocking member 23 is provided on the second base portion 20. Specifically, an end of the locking member 12 is provided with a pushing portion 122 cooperating with the second base portion 20, and the other end of the locking member 12 is provided with a clamping portion 121 cooperating with the frame 30. In the locking state, the clamping portion 121 is away the clamping hole 33 on the frame 30, and when the unlocking member 23 pushes the locking member 12, the locking member 12 cannot move. In the unlocking state, the clamping portion 121 is aligned with the clamping hole 33 on the frame 30, and when the unlocking member 23 pushes the locking member 12, the locking member 12 moves along a direction away from the unlocking member 23, so that the clamping portion 12 is located within the clamping hole 33. The unlocking member 23 is provided with an unlocking portion 232 cooperating with the pushing portion 122, the pushing portion 122 is provided with a pushing inclined surface 1221, the unlocking portion 232 is provided with a driving inclined surface 2321, and the pushing inclined surface 1221 is in slide contact with the driving inclined surface 2321. The operating portion 231 on the unlocking member 23 protrudes out of the second base portion 20, and the operating portion 231 is pulled so that the unlocking member 23 is rotated, thereby causing the driving inclined surface 2321 to be pressed at the pushing inclined surface 1221. The driving inclined surface 2321 and the pushing inclined surface 1221 are both disposed obliquely, so that when the operating portion 231 is pulled, the driving inclined surface 2321 presses the pushing inclined surface 1221, so as to convert a force in the horizontal direction into a force in the vertical direction, thereby moving the locking member 12 downwards and clamping the clamping portion 121 within the frame 30 to complete unlocking.

Referring to FIGS. 7, 11 to 16, 18, and 19, in the present embodiment, the locking member 12 is provided, so that the first base portion 10 needs to slide to a position where the clamping portion 121 corresponds the clamping hole 33 on the frame 30 to unlock, and thus there may be a rotation between the first base portion 10 and the second base portion 20. When the first base portion 10 is located at the most front of the frame 30, i.e., the first base portion 10 is at a side away from a backrest of the vehicle seat, the clamping hole 33 may cooperate with the clamping portion 121, and at this time, the second base portion 20 may be rotate relative to the first base portion 10. It may be understood that when the first base portion 10 is located in other position of the frame 30, the second base portion 20 is rotated, and the second base portion 20 may drive the carrier body 200 to rotate. At this time, since positions of the first base portion 10 and the second base portion 20 are close to the backrest of the vehicle seat, the carrier body 200 may collide with the backrest of the vehicle seat during rotation, which may not only damage the seat body, but also cause a certain danger to the baby on the seat body. Therefore, the locking member 12 is disposed, so that when the first base portion 10 is located on a position of the frame 30 that is farthest away from the backrest, i.e., only the first base portion 10 slides to the most front of the frame 30, the second base portion 20 may be rotated relative to the first base portion 10, enabling it to be safer to use.

Figure 14:
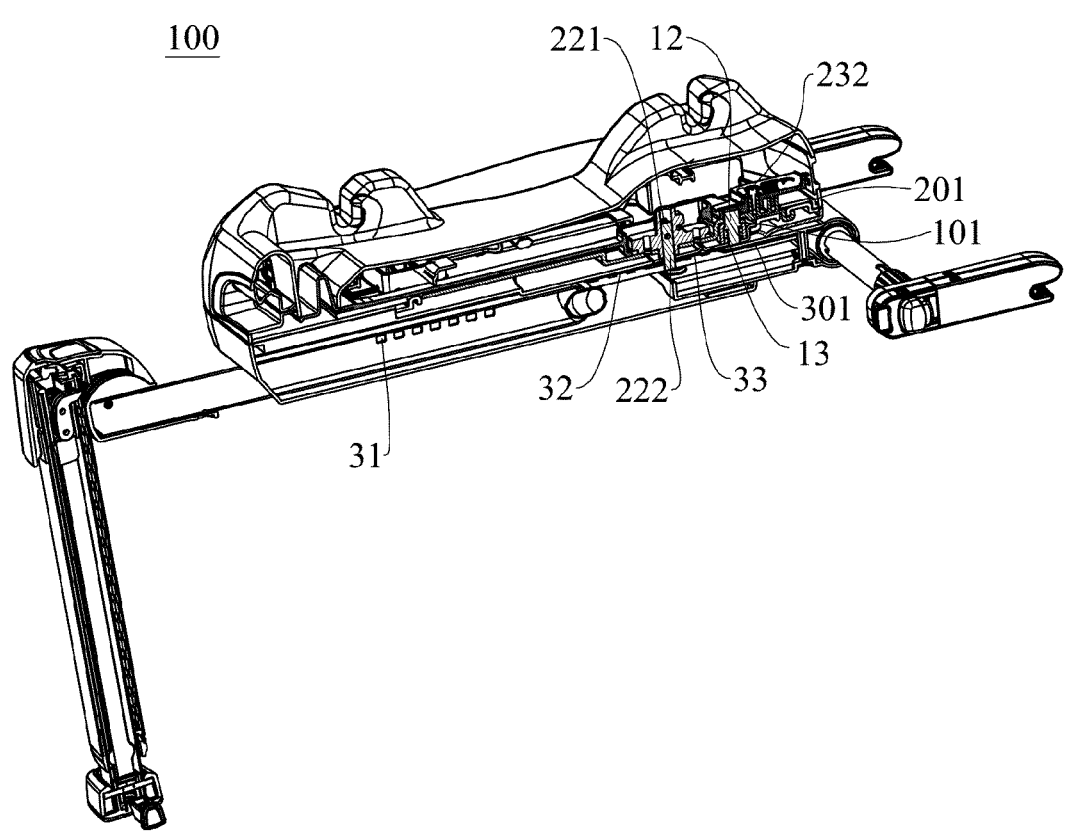
FIG. 14 is a sectional structural schematic view of the rotary structure in FIG. 3 in a locking state.
Figure 15:
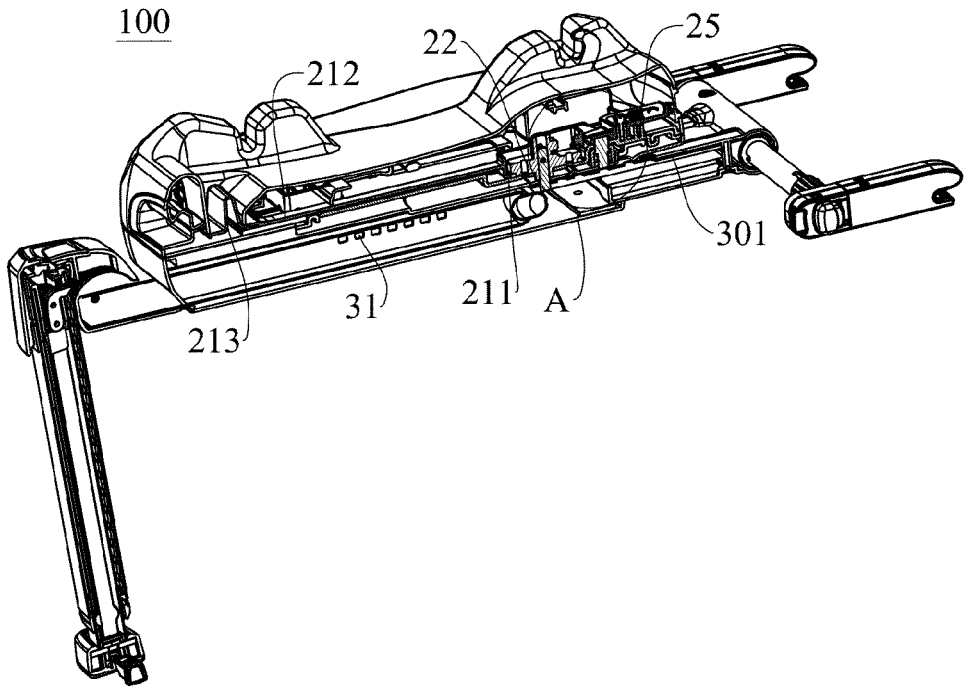
FIG. 15 is a sectional structural schematic view of the rotary structure in FIG. 3 in an unlocking state.
Figure 16:
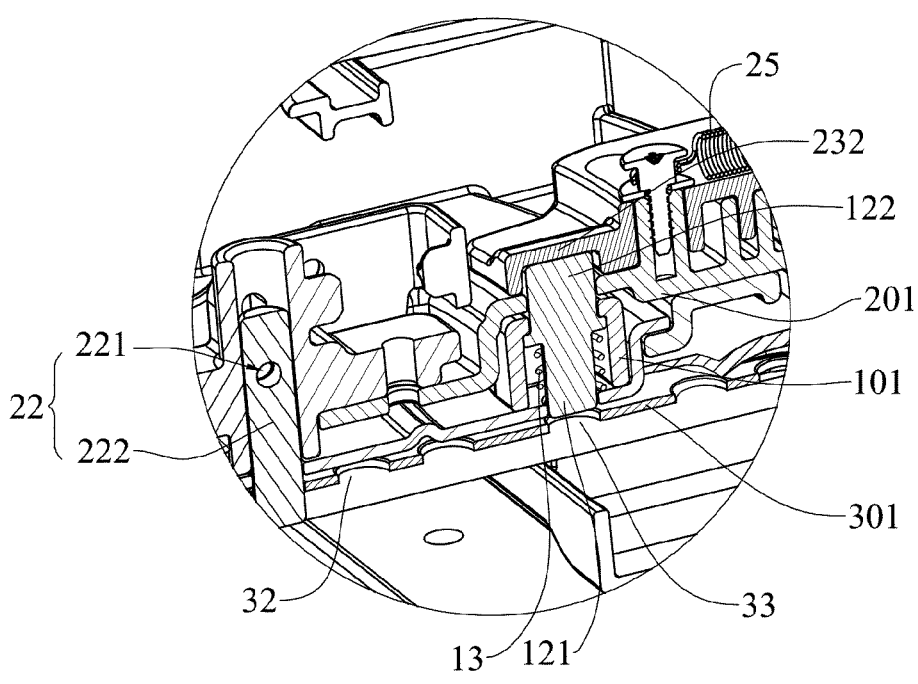
FIG. 16 is an enlarged view at A in FIG. 15.

Referring to FIGS. 14 to 16, in some optional embodiments, there are a locking position and an unlocking position which are cooperating with the locking member 12 on the frame 30. When the first base portion 10 slides into the locking position along the frame 30, the pushing portion 122 is clamped to the unlocking portion 232 to stop the second base portion 20 from being rotated relative to the first base portion 10. When the first base portion 10 slides into the unlocking position along the frame 30, the unlocking member 23 is driven, so that the pushing portion 122 slides at the unlocking portion 232 to unlock, thereby enabling the second base portion 20 to be rotated relative to the first base portion 10. It could be understood that the unlocking position is a position of the first base portion 10 located at the most front of the frame 30, i.e., a position of the frame 30 that is farthest from the seat backrest during installation. The locking position is any position on the frame 30 away from the unlocking position. An end of the locking member 12 is the pushing portion 122, which cooperates with the second base portion 20; and the other end of the locking member 12 is the clamping portion 121, which cooperates with the frame 30. When the first base portion 10 slides into the locking position of the frame 30, the clamping portion 121 on the locking member 12 is away from the clamping hole 33 on the frame 30, so that the driving portion 211 cannot push the pushing portion 122, and the second base portion 20 is fixed on the first base portion 10 to stop the second base portion 20 from being rotated relative to the first base portion 10. When the first base portion 10 slides into the unlocking position of the frame 30, the clamping portion 121 on the locking member 121 is aligned with the clamping hole 33 on the frame 30, and when the driving portion 211 presses the pushing portion 122, the locking member 12 moves to enable the clamping portion 121 on the locking member 12 to be clamped within the clamping hole 33 of the frame 30, so that the locking member 12 is disengaged from the unlocking member 23, thereby causing unlocking between the second base portion 20 and the first base portion 10, and then the second base portion 20 may be rotated relative to the first base portion 10.

Referring to FIGS. 14 to 16, in the present embodiment, the first base portion 10 is provided with a first housing 101, the second base portion 20 is provided with a second housing 201, and the frame 30 is provided with a third housing 301. The pushing portion 122 of the locking member 12 protrudes out of the first housing 101, and the second housing 201 is opened with a hole for the pushing portion 122 to extend into and cooperate with the unlocking portion 232, so that the pushing portion 122 is in slide contact with the unlocking portion 232. The third housing 301 of the frame 30 is provided with a clamping hole 33 cooperating with the clamping portion 121, and the unlocking portion 232 presses the pushing portion 122, so that the clamping portion 121 protrudes out of the second housing 201 so as to cooperate with clamping hole 33, thereby unlocking between the first base portion 10 and the second base portion 20. That is, when the first base portion 10 slides into the clamping portion 121 along the frame 30 to be clamped with clamping hole 33, the locking member 12 is disengaged from the unlocking member 23, thereby unlocking and thus rotating between the second base portion 20 and the first base portion 10.

Referring to FIGS. 11 to 17, in some optional embodiments, the locking member 12 is provided with a second reset member 13 with which the locking member 12 constantly contacts with the unlocking member 23, and the second reset member 13 has a spring structure. The second reset member 13 is provided with the spring structure, and when the second base portion 20 is rotated to align the locking member 12 with the unlocking member 23, the locking member 12 may reset automatically. The unlocking member 23 is provided with a third reset member 25 providing a constant reset trend for the unlocking member 23, and the third reset member 25 is a tension spring. When the unlocking member 23 is rotated to press the locking member 12, the third reset member 25 in the structure of tension spring may store energy, and when the locking member 12 is disengaged from the unlocking member 23, the energy stored by the tension spring may drive the unlocking member 23 to reset automatically.

As shown in FIGS. 1 to 19, the baby carrier 1000 of the present disclosure includes a rotary structure 100, the carrier body 200 may be driven to rotate through the rotary structure 100, thereby providing different visual experiences for the baby, and being convenient for the caregiver to take care of the baby, and the caregiver may rotate the carrier body to a suitable position to facilitate taking care of the baby. The rotary structure 100 includes a frame 30, a first base portion 10 slidably disposed on the frame 30, and a second base portion 20 rotatably connected to the first base portion 10. When the first base portion 10 is located at the most front of the frame 30, the second base portion 20 may be rotated relative to the first base portion 10. When the first base portion 10 is located in a position of the frame 30 other than the most front, the second base portion 20 is locked to the first base portion 10, and cannot be rotated, thereby avoiding interference with the vehicle seat when the second base portion 20 drives the carrier body 200 to rotate and thus affect the safety of use. The second base portion 20 is provided with a positioning member 22, while the first base portion 10 is provided with a plurality of positioning holes 11, and in the present embodiment, there may be three positioning holes 11 that are respectively located in the most front position away from the frame 30 and the left and right sides correspondingly disposed, so that the carrier body 200 may be fixed backwards, leftwards and rightwards. That is, the positioning member 22 cooperates with the positioning holes 11 in different directions, so that the carrier body 200 may be used backwards or laterally. In the rotary structure 100 of the present disclosure, the structure is simple, the operation is convenient, and operating the unlocking lever 213 and the operating portion 231 may provide rotation between the first base portion 10 and the second base portion 20 to adjust an angle, so that the seat installed on the rotary structure 100 may be located in different locations of the vehicle seat according to actual requirements, which is safe and reliable, more convenient for the caregiver to take care of the baby, and suitable for widespread use.

The above-disclosed are merely preferred examples of the present disclosure, and cannot be intended to limit the scope of the present disclosure, therefore equivalent variations made according to the claims of the present disclosure fall within the scope of the present disclosure.

What is claimed is:

1. A baby carrier having a rotary structure comprising:
   a first base portion and a second base portion rotatably disposed on the first base portion;
   at least two positioning holes provided on the first base portion;
   a positioning member telescopically provided on the second base portion, the second base portion is rotatable relative to the first base portion and enables the positioning member to cooperate with the different positioning holes; and
   a driving member disposed on the second base portion and configured to drive the positioning member, an end of the driving member is provided with a driving portion cooperating with the positioning member, a driving inclined slot is provided on the driving portion for cooperating with the positioning member, and the positioning member is slidably provided within the driving inclined slot.

2. The baby carrier according to claim 1, further comprising a frame connected with the first base portion,
   wherein the first base portion is slidably disposed at the frame, and the first base portion is clamped with the frame at multiple sections.

3. The baby carrier according to claim 1, wherein a plurality of positioning holes are located on a same circumference.

4. The baby carrier according to claim 1, wherein the driving inclined slot is disposed obliquely on the driving portion at a preset angle.

5. The baby carrier according to claim 1, wherein an end of the driving member away from the driving portion is connected with an unlocking operating element, an end of the unlocking operating element protrudes out of the second base portion, and the driving portion slides with the unlocking operating element by means of operating the unlocking operating element and drives the positioning portion to slide along the driving inclined slot, thereby disengaging the positioning member from the positioning hole.

6. The baby carrier according to claim 5, wherein a first reset member is disposed on the unlocking operating element for providing a reset trend for the unlocking operating element.

7. The baby carrier according to claim 1, further comprising a frame connected with the first base portion,
   wherein the positioning member is provided with a positioning pin, the positioning pin is clamped with the positioning hole with movement of the positioning member or clamped with the positioning hole and a frame hole of the frame, or the positioning pin is disengaged from the positioning hole with movement of the positioning member.

8. The baby carrier according to claim 7, wherein the positioning pin is detachably provided within the positioning member.

9. The baby carrier according to claim 7, wherein the positioning pin and the positioning member are formed as an integral structure.

10. The baby carrier according to claim 1, wherein the positioning member is retractable within the second base portion.

11. The baby carrier according to claim 10, wherein the driving member is configured to drive the positioning member to retract into the second base portion to allow the second base portion to be rotatable relative to the first base portion.

12. The baby carrier according to claim 1, wherein the driving portion is located at a periphery of the positioning member; the positioning member is provided with a positioning portion in a first direction, the driving inclined slot is provided for cooperating with the positioning portion, and the positioning portion is slidably provided within the driving inclined slot.

13. A baby carrier having a rotary structure comprising:
   a first base portion and a second base portion rotatably disposed on the first base portion;
   at least two positioning holes provided on the first base portion; and
   a positioning member telescopically provided on the second base portion, the second base portion is rotatable relative to the first base portion and enables the positioning member to cooperate with the different positioning holes;
   a frame connected with the first base portion; and
   a locking member provided on the first base portion for locking with the second base portion or the frame, a first end of the locking member is provided with a pushing portion cooperating with the second base portion, and a second end of the locking member is provided with a clamping portion cooperating with the frame.

14. The baby carrier according to claim 13, wherein the second base portion further comprises an unlocking member that is rotatable.

15. The baby carrier according to claim 14, wherein a second reset member is provided on the locking member for contacting the locking member with the unlocking member.

16. The baby carrier according to claim 14, wherein a third reset member is provided on the unlocking member for providing a constant reset trend for the unlocking member.

17. The baby carrier according to claim 14, wherein the unlocking member is provided with an unlocking portion for cooperating with the pushing portion.

18. The baby carrier according to claim 17, wherein the pushing portion is provided with a pushing inclined surface, the unlocking portion is provided with a driving inclined surface, and the pushing inclined surface is in slide contact with the driving inclined surface.

19. The baby carrier according to claim 17, wherein the frame has a locking position and an unlocking position for cooperating with the locking member, when the first base portion slides into the locking position along the frame, the pushing portion is clamped with the unlocking portion to stop the second base portion from being rotated relative to the first base portion; and when the first base portion slides into the unlocking position along the frame, the pushing portion slides at the unlocking portion to unlock by means of driving the unlocking member, thereby enable the second base portion to be rotatable relative to the first base portion.

20. The baby carrier according to claim 13, wherein the frame is provided with a clamping hole for cooperating with the clamping portion, and when the first base portion slides into the clamping portion along the frame and is clamped with the clamping hole, the second base portion is rotatable relative to the first base portion.

\* \* \* \* \*